Aug. 1, 1950 J. R. DEWAR 2,517,291

GAS TUBE AND RESISTOR SHUNT TO PREVENT DISTORTION AT IMPULSE CONTACTS

Filed April 25, 1947 2 Sheets-Sheet 1

INVENTOR.
JAMES R. DEWAR

BY D. Clyde Jones

ATTORNEY

Aug. 1, 1950

J. R. DEWAR 2,517,291

GAS TUBE AND RESISTOR SHUNT TO PREVENT DISTORTION AT IMPULSE CONTACTS

Filed April 25, 1947

2 Sheets-Sheet 2

INVENTOR.
JAMES R. DEWAR
BY
D. Clyde Jones
ATTORNEY

Patented Aug. 1, 1950

2,517,291

UNITED STATES PATENT OFFICE 2,517,291

GAS TUBE AND RESISTOR SHUNT TO PREVENT DISTORTION AT IMPULSE CONTACTS

James R. Dewar, Rochester, N. Y.

Application April 25, 1947, Serial No. 743,897

6 Claims. (Cl. 179—16)

This invention relates to an electrical impulsing arrangement which has particular utility in an impulse or stepping circuit for use in controlling the operation of selective switching means in an automatic telephone system or the like.

In many impulse-controlled electrical devices, it is highly essential to the reliable operation thereof, that the ratio of "breaks" to the "makes" in the electrical current, constituting the impulses, be maintained uniform even under the varying conditions encountered in service. Specifically in an automatic telephone system, switching means is controlled by impulses in an impulsing or stepping circuit, the impulse ratio of which, namely, the lengths of the "breaks" in relation to the "makes," is for example as sixty is to forty. Any material distortion or change in the impulse ratio from that chosen, will result in the erratic operation of the switching means with the consequent wrong substation selection or so-called wrong numbers.

Much of the pulse-ratio distortion encountered in former automatic telephone systems has arisen because of the spark arresting means used to protect the interrupting contacts in the stepping circuit. The conventional spark arresting means for the contacts of a relay or magnet to be protected, comprises a resistor or a capacitor and a resistor connected across the same, the capacitance and resistance of which tend to distort the impulse ratio. The seriousness of this distortion has caused telephone engineers notably those of the British Post Office system and the American Telephone and Telegraph Company to develop various arrangements for correcting or restoring the original pulse form after the distortion has occurred. An example of one of these pulse correcting systems is disclosed in the patent to Newby 1,829,837, granted November 3, 1931, to the American Telephone and Telegraph Company as assignee.

In accordance with the present invention there is provided an arrangement which substantially prevents impulse ratio distortion and thereby obviates the need for impulse correcting equipment. The present arrangement also provides arc-suppression at the rhythmically operated contacts in an impulsing system, whereby the need for precious metal contacts can be eliminated in many instances.

The various features and advantages of the present invention will appear from the detailed description and claims when taken with the drawings in which:

Fig. 1 is a diagrammatic showing of the invention applied to a selector switch circuit disclosed as a part of a telephone connection, the other switches necessary in completing the connection having been omitted;

Fig. 2 is a diagrammatic showing of the invention applied to a P. B. X trunk repeater circuit;

Fig. 3 is a front view of the glow discharge lamp and resistor enclosed in cylindrical insulating tube having a window therein while Fig. 4 is a longitudinal section through the lamp and the related parts;

Fig. 5 illustrates the invention incorporated in a connector circuit; and

*Selector switch*

Figures 1, 2:
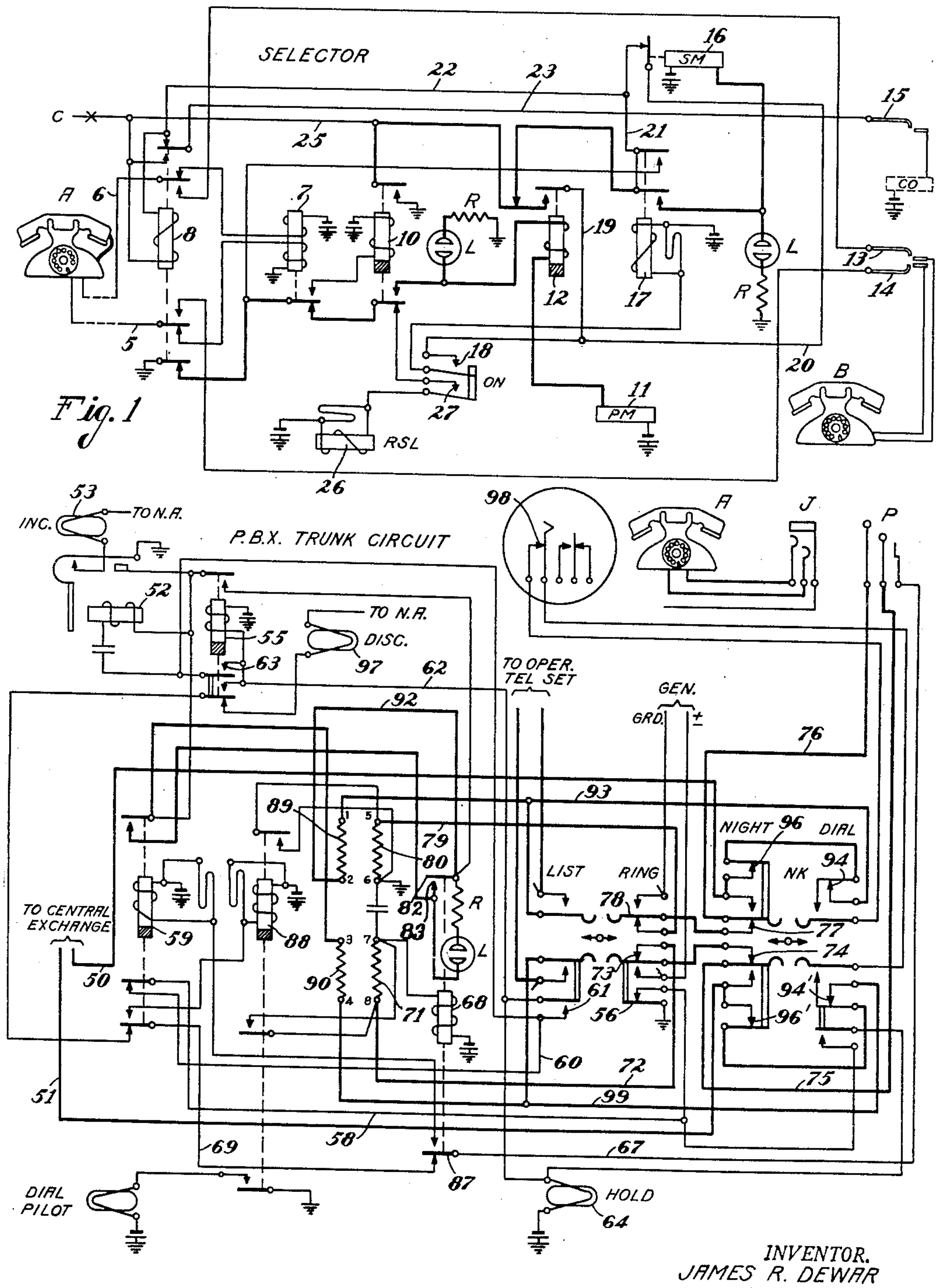

It is believed that the invention will best be understood by first describing the operation of the circuits of a Strowger type selector switch, shown in Fig. 1, in extending a call. When the subscriber at the substation A removes his receiver from his desk stand, his telephone line including the tip conductor 5 and the ring conductor 6 are extended in series to an idle selector switch which is assumed to be the selector switch illustrated. The calling subscriber's line may be extended to this idle selector switch either by a line switch (not shown) individual to the calling line or by a line finder (not shown) which hunts for and extends calling lines to an idle trunk and selector switch in the well-known manner.

On the seizure of the mentioned selector switch, a circuit is completed from the impulse or stepping relay 7 from grounded battery, upper winding of this relay, back contact and upper armature of the back bridge relay 8, ring conductor 6 and tip through the calling substation A, tip conductor 5, armature and back contact of relay 8, lower winding of the relay 7 to ground. The impulse relay 7, when thus energized, closes an operating circuit for the slow releasing relay 10, from grounded battery, winding of this relay, front contact and armature of the impulse relay 7, back contact and armature of the relay 8 to ground. The relay 10 controls the release of the selector in the well-known manner as will be further referred to. If the selector herein illustrated is used as a first selector, the subscriber on dialing the first digit of the wanted subscriber's number, will cause the impulse relay 7 to retract and attract its armature once for each impulse corresponding to the digit dialed. When the impulse relay 7 retracts its armature it closes an operating circuit for the primary or vertical motor magnet 11. Since the switch herein referred to moves vertically in response to impulses, it moves its brushes vertically for each pulse to select a group of trunks. The circuit for the motor magnet 11 is completed from grounded battery winding of this magnet 11, winding of the slow releasing change-over relay 12, front contact and lower armature of slow releasing relay 10, back contact and armature of the impulse relay 7, back contact and lowermost armature of the relay 8 to ground. As a result of the operation of the motor magnet 11 the ring brush 13, the tip brush 14 and the test brush 15 are positioned opposite the first group of trunks appearing in this switch. On the completion of this first stepping movement of the selector switch, the off normal switch contacts ON are closed. As soon as the off normal switch ON is thus operated, an energizing circuit is completed for the test relay 17. The circuit for this relay is extended from grounded battery, winding of relay 17, off normal contacts 18, conductor 20, armature and front contact of the slow releasing change-over relay 12, armature and front contact of the slow releasing relay 10 to ground. The relay 17 at its inner armature and front contact closes a break point in the operating circuit of the secondary motor magnet 16. However, the circuit for this magnet is held open at the back contact and continuity spring of the change-over relay 12 until the close of the series of dialing impulses being transmitted to this switch. At the close of this series of impulses, change-over relay 12 releases and the secondary motor magnet 16 then effects a trunk hunting movement in the secondary or rotary direction to advance the brushes 13, 14 and 15 into the selector bank where they contact the terminals of the first trunk in the selected group. The operating circuit for the motor magnet 16 is completed from grounded battery, winding of this magnet, inner front contact and armature of the relay 17, back contact and continuity spring of the change-over relay 12, upper armature and front contact of the slow releasing relay 10 to ground. It will be noted that on the release of the change-over relay 12, the original energizing circuit of the relay 17, which included conductor 19, is interrupted at the upper armature and front contact of the slow releasing relay 12. However, an alternative circuit is closed for the relay 17 from grounded battery, its winding, off normal contacts 18, conductor 20, armature and back contact of the secondary motor magnet 16, conductor 21, back contact and continuity spring of the change-over relay 12 (now deenergized) upper armature and front contact of the slow releasing relay 10 to ground. The secondary motor magnet 16 is operated in this circuit to advance the brushes 13, 14 and 15 of the selector switch into engagement with the set of contacts individual to the first trunk in the selected group. When the secondary motor magnet 16 operates in the circuit just described, it opens its armature and back contact and thereby interrupts the energizing circuit of the relay 17 which had been completed therethrough. If it is assumed that the first trunk in the selected group is busy, this condition will be indicated by the presence of ground on the test terminal with which the test brush 15 is now in engagement. As a result of this condition, the relay 17 will again be energized. However, in this instance it will be energized in a circuit from grounded battery, winding of relay 17, off normal contact 18, conductor 20, armature and back contact of the magnet 16, conductor 22, back contact and uppermost armature of the relay 8, conductor 23 to the test brushes 15 and thence to ground over the test terminal of the busy trunk. When the relay 17 is thus energized, it completes again the operating circuit for the secondary motor magnet 16 previously described. The magnet 16 is thus operated and advances the switch brushes 13, 14 and 15 an additional step into engagement with the set of terminals of the next trunk in the group. Also, when the motor magnet 16 operates, it opens its armature and back contact and thereby interrupts the operating circuit of the relay 17. This alternate operation of the motor magnet 16 and the relay 17 due to the interruption of the operating circuit of the relay 17 by the motor magnet 16 and the subsequent interruption of the circuit of the motor magnet 16 by the relay 17, continues until the test brush 15 of the selector switch encounters the test terminal of an idle trunk in the selected group which terminal is characterized by the absence of ground potential thereon.

It will be noted that the backbridge relay 8 is held inoperative during the period that the selector switch is hunting for an idle trunk. This is due to the fact that the relay 8 is short-circuited from ground at each busy trunk, test brush 15, conductor 23, upper armature and back contact of relay 8 to the upper terminal of this relay. Also, ground potential is applied through the upper front contact and armature of relay 10, conductor 25 to the lower terminal of the winding of relay 8. When, however, an idle trunk is located, the mentioned short-circuit about the winding of relay 8 no longer prevails but is now operated in a circuit completed from grounded battery, winding of relay 17, contacts 18, conductor 20, armature and back contact of magnet 16, conductor 22, winding of relay 8, conductor 25, armature and front contact of relay 10, to ground. While relay 8 operates in this circuit, relay 17, which is marginal, does not operate. When relay 8 operates, it extends the tip and ring sides of the subscriber's line through the tip and ring brushes of the selector switch to the succeeding switch, such as a selector or connector (not shown) to be used in extending the connection. When the relay 8 operates, it cuts off the impulse relay 7 from control over the subscriber's line. Relay 7, then, deenergizes and thereafter the slow releasing relay 10 deenergizes. Before the slow releasing relay 10 deenergizes, to remove ground potential from conductor 25 in the operating circuit of relay 8, a substitute circuit for relay 8 is completed from the lower terminal 8 of the winding of relay 8, upper front contact and armature of this relay, conductor 23, test brush 15 and thence to ground at a relay similar to relay 10, of the seized succeeding switch. The release magnet 26 does not operate at this time because its operating circuit is interrupted at the back contact and lowermost armature of the back bridge relay 8. However, at the time of releasing the connection, the back bridge relay 8 will be deenergized in the well-known manner. At this time the release magnet 26 is operated to release the switch in a circuit extending from grounded battery, winding of magnet 26, off normal contacts 27, back contacts and armatures of relays 10, 7 and 8 to ground.

From the foregoing description it will be understood that when the impulse or stepping relay 7 responds to the dial impulses, the current in the stepping relay is interrupted, in synchronism with each impulse of the dial at the calling substation. The impulsing contacts of the stepping relay are closed each time that the stepping relay restores, and at that time the motor magnet 11 (or counting relays to be referred to hereinafter in the modification of Fig. 6) are actuated. The impulsing contacts are opened when the stepping relay is reoperated. At this time the impulsing contacts must open the circuit to the motor magnet or counting relays of the automatic system. The motor magnet or counting relays, because they must respond to rapid interruptions, are of relatively high impedance, and when the circuit to them is opened, a voltage much higher than the operating voltage, for example fifty volts used in the telephone system, is impressed across the impulsing contacts. If these contacts were not protected, the breaking of the current and the resultant rise in voltage across the contacts, would cause an arc discharge across the contact gap, which would change the pulse ratio and eventually destroy the contacts.

The conventional arrangement for protecting these contacts is to provide a condenser in series with a resistor across the contacts. This arrangement in some cases reduces the arc discharge but eventually the contacts are destroyed. However, such an arrangement introduces electrostatic capacity into the circuit to the motor magnet or counting relays, which tends to slow the release of the magnet or relays because of the charged condition of the condenser. This slow releasing effect can be explained in the following manner. When a resistor and condenser are used to shunt a contact for arc suppression, the shunt causes a drop in potential across the contacts, when the contacts open. The condenser charges relatively slowly and permits some ionization across the contact gap. When the contact gap widens the arc is cut off and the condenser becomes charged.

This charged condenser at this time is in series with the operated motor magnet or counting relay, and tends to hold it operated. In fact, many circuits employ a condenser across a relay winding to slow the release of the relay. Incidentally, the patent to Matousek No. 2,322,650, granted June 22, 1943 (Cl. 179—18), discloses the use of an electron tube preferably of the gas-filled discharge type for slowing the release of a relay or as stated in that patent, "the release period of the relay is enhanced by utilizing an electron discharge tube to sustain the current flow through the winding of the relay . . .". It should also be noted that the speed of the dials are not uniform, and as the values of the condenser and resistor are fixed, complete arc suppression cannot be obtained. The charge and discharge rate of the condenser also varies with the speeds of various dials and the action of the motor magnet or counting relays cannot be in synchronism with the pulse ratio of the dial.

Figures 3, 4, 5:
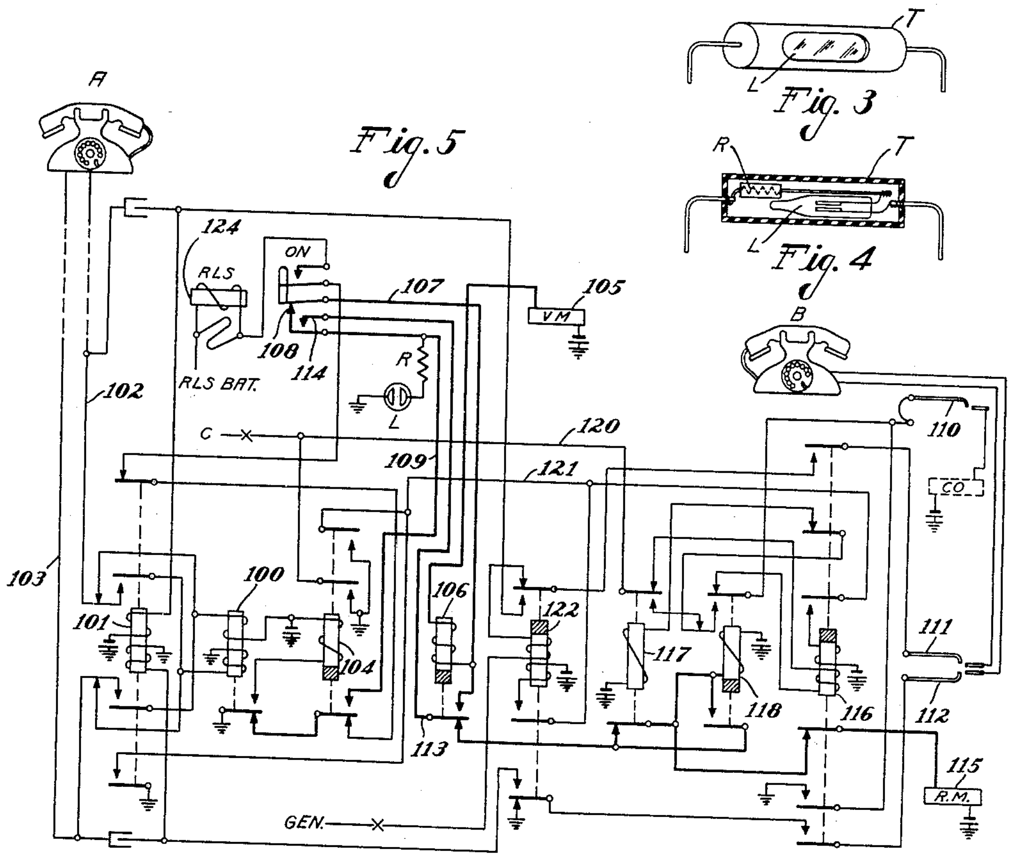

In accordance with the present invention, an arc discharge device L in series with a suitable resistor R are connected across the normally closed impulse contacts of the impulse relay to prevent impulse ratio distortion, thereby effecting impulse stabilization, and also to prevent arcing at these contacts. Preferably the device L and the resistor R are contained in a windowed tube T of insulating material which is sealed at its ends. The overall dimensions of the tube can be one and one-quarter inches long and three-eighths of an inch in diameter. While several different types of arc discharge devices may be used, it is preferable to use a neon glow lamp of the type now sold by the General Electric Company under the code number NE2. As shown in Figs. 3 and 4, this glow lamp comprises two spaced electrodes in a neon atmosphere or the like enclosed in a sealed glass envelope. This glow lamp is so designed that the gas therein will "break down" or ionize on the application of ninety volts thereto but maintains its ionization at a sustaining voltage of only eighty volts. Both of these voltages are considerably higher than the voltage of the operating battery of the system which is assumed to be fifty volts. Therefore, the presence of the neon glow lamp and resistor across the contacts of the impulse relay 7 will not affect the operation or release of the motor magnet (or counting relays Fig. 6).

It should be pointed out that the glow lamp does not retain an electrostatic charge. This arises from the fact that the electrodes are suitably spaced in the neon atmosphere through which a charge which might tend to accumulate, leaks away since some emission is always present in the lamp.

Furthermore, the neon lamp and resistor pass very little current (approximately .003 ampere in the case assumed) and that current passes only for an instant. These elements pass current in an electrical circuit as the equivalent of a counter electromotive force with an internal resistance. All gaseous-conduction lamps, of which the neon glow lamp is one, have a negative or "run-away" characteristic. If the lamp were connected directly across a source of voltage sufficiently high to ionize the gas, the current would immediately rise to such values as to destroy the lamp. In accordance with the present invention the glow lamp has connected in series therewith the resistor R which in the example here assumed has a value of four thousand ohms so that the "run-away action" will be prevented and the tube will not be destroyed.

*Trunk repeater circuit*

In Fig. 2, the invention is shown applied to a P. B. X trunk circuit of the repeating coil type which is provided with through supervision and with operator or subscriber dialing. Let it be assumed that an incoming call has been extended to the conductors 50 and 51 of the trunk circuit herein illustrated. In the course of extending the call to this trunk, ringing current from the distant central office operates relay 52 which locks up mechanically in the well-known manner and lights the incoming lamp 53. When the operator in response to the lighting of the lamp 53 answers the call by operating the listening key LIST, the slow releasing relay 55 is operated from ground at the contacts 56 of the ringing key RING, conductor 58, inner armature and back contact of the slow releasing relay 59, conductor 60, contacts 61 of the listening key, now closed, conductor 62, winding of the slow releasing relay 55 to grounded battery. The relay 55 locks up through its armature 63 and front contact, armature and back contact of relay 59, conductor 58, contacts 56 of the ringing key to ground. The operation of the relay 55 unlatches the armature spring of the relay 52 thereby permitting relay 52 to release and thereby extinguishing the incoming signal 53. By the operation of relay 55, the repeating coil is also closed across the incoming line to trip the machine ringing and to give supervision to the distant central office. The green "hold" lamp 64 is lighted through a contact 63 of relay 55 to ground on the ringing key. This indicates to the P. B. X operator that the call has been automatically held.

If the incoming call is to be extended to a subscriber's telephone line, the plug in which this trunk terminates is inserted in the line jack of this line and the ringing key RK is depressed. Ground from the sleeve of the call subscriber's line, holds the relay 55 operated while the ringing key RING is depressed. The mentioned ground is applied over the conductor 67, armature and back contact of relay 68, conductor 69, armature and back contact of relay 59, armature and front contact of relay 55, winding of this relay to ground.

When the subscriber at the called substation answers the relay 68 is operated from grounded battery, winding of this relay through the repeating coil 71, conductor 72, contacts 73 of ringing key, contacts 74 of the night key NK, conductor 75, through the ring conductor of the subscriber's line, thence through the tip side of this line, tip conductor 76 of the trunk, contacts 77 of the night key, contacts 78 of the ringing key now closed, conductor 79, winding 80 of the repeating coil to ground. The operation of the relay 68 closes a circuit from ground on the sleeve of the called subscriber's line, to operate the relay 59. The circuit for the relay 59 is traceable from grounded battery, winding of this relay, front contact and armature 87 of relay 68, conductor 67, to the ground on the mentioned sleeve of the subscriber's line. The relay 59 when operated connects the repeating coil across the trunk leading to the central office. When relay 59 operates, it effects the release of the relay 55 so that the green hold lamp 64 is extinguished.

Transmitter battery to the called telephone station is supplied locally from the relay 68 and the repeating coil. Supervision to the P. B. X operator and to the central office operator is under the control of the called subscriber's substation telephone. Disconnect supervision is provided for the P. B. X and central office operators when the subscriber at the called substation hangs up.

*Out-going calls to manual office*

If the P. B. X operator wishes to make a central office call, the listening key LIST is operated as before. The operation of the listening key effects the operation of the relay 55 as previously described. The relay 55 is then locked operated through its lower armature and contact 63, and through the break contact and armature of relay 59, conductor 58, to ground on the ringing key as already set forth. The repeating coil is also closed across the connection to give supervision to the distance central office. The green hold lamp 64 is lighter through a contact of the relay 55 to ground on the ringing key as already set forth. This indicates to the P. B. X operator that the call has been automatically held as already set forth. The repeating coil which at this time is bridged across the trunk operates a relay (not shown) in the central office to light a lamp there. Battery is supplied to the P. B. X operator's transmitter locally from the retard coil in the operator's telephone circuit (not shown).

When the P. B. X operator wishes to recall the central office operator, the night key NK should be slowly operated several times. This will open the trunk line herein illustrated and will disconnect the repeating coil bridge from the trunk thereby permitting the central office supervisory relay (not shown) to release in synchronism with the operation of the night key. This will cause the supervisory lamp (not shown) in the distant central office, to flash.

When a calling subscribed wishes to make an out-going call to a central office, the trunk plug P is inserted in the station-jack J and the relays 68 and 59 are operated as previously described. Battery supply is furnished to the calling substation as previously described. P. B. X supervision as well as central office supervision is provided in the manner already set forth.

*Out-going calls to dial office*

When a subscriber at the P. B. X office makes a trunk call to a dial central office, the local trunk circuit operates in the manner already set forth. As soon as the P. B. X operator inserts the trunk plug into the jack of the calling substation, if the dial equipment at the distant office is available, the subscriber will hear a dial tone and should then proceed to dial the central office number desired. The relay 68 will be energized in the circuit already described which circuit includes the two sides of the telephone line in series. Each time that the calling subscriber's line is interrupted at the substation thereof, by the operation of the dial, the relay 68 will follow these impulses and will open and close the repeating coil across the trunk line. The relay 59 which is slow releasing will remain operated during the repeated energization and deenergization of the relay 68, to prevent the disconnect lamp 97 from lighting at this time. While the relay 68 is attracting and retracting its armature in response to the dial impulses, its contacts 82 and 83 are protected by the neon lamp L and the resistor R in series therewith, for the same purpose and with like advantage as described in connection with the selector circuit of Fig. 1.

It should here be pointed out that another condition which can have a serious effect on the pulse ratio, is the high impedance discharge of the stepping relay in the selector or connector circuit of an automatic telephone system with which this repeater may be used. This stepping relay is actuated by the contacts of the trunk repeater relay and should be so designed that it faithfully reproduces the impulses set up by the dial. However, in most types of dial systems the stepping relay also serves as the battery supply relay to the "calling" party, and is designed for high impedance, so that voice frequencies will not return through the central office storage battery, to cause cross talk. The present invention satisfies the operating requirements encountered in such connector circuits. Therefore, the relay 68 will repeat the dial impulses substantially undistorted. In response to each dial impulse, the relay 68 will attract its armatures, thereby closing an impulse repeating circuit from the armature 82 of this relay, conductor 92, repeating coil winding 89, conductor 93, contacts 94 of the dial key DIAL, contacts 96 of the night key NIGHT, trunk conductor 50, leading to the distant office, through the winding of an impulse receiving relay (not shown) at that office, thence through the trunk conductor 51, contacts 96' of the night key, contacts 94' of the dial key, conductor 99, winding 90 of the repeating coil, upper front contact and armature of relay 59, front contact 83 of relay 68 to the armature 82 of this relay, at which point the circuit is completed. At the first interruption of the subscriber's line at the dial impulse springs (not shown), the relay 68 will release and at its armature 87 and back contact it will complete a circuit for energizing the slow releasing relay 88 which operates and is sufficiently slow in releasing that it will remain operated during the transmission of the dial impulses. At the close of the series of impulses, relay 88 will release. When the relay 88 operates, it short-circuits both of the trunk windings 89 and 90 of the repeating coil to remove the impedance of all of the repeating coil windings, so that the dial impulses will not be distorted.

Supervision is provided for the P. B. X operator and for the central office dial equipment, when the subscriber at the calling substation hangs up his receiver thereby causing the relays 68 and 59 to restore.

*Operator dialing*

If the P. B. X operator wishes to make a call from her switchboard to a dial central office, the listening key is operated as before and if an idle path in the dialing system at the distant dial central office is available, the operator will hear a dial tone. When the listening key is operated, the P. B. X trunk equipment will function in the manner already described.

In order for the P. B. X operator to transmit dial impulses it will be necessary for her to operate the dial key. The operation of this key opens the P. B. X trunk equipment and places the dial impulse contacts 98 directly across the trunk line. The dial key is equipped with make before break spring combinations on the tip and ring springs thereof so that the continuity from the repeating coil to the dial pulse contacts is maintained and at no time either in the operation or restoration of the dial key will the short or holding circuit be broken. This circuit arrangement is necessary to prevent preliminary pulses which might result in wrong numbers.

When dialing has been completed, the dial key will be restored by the operator so that this operator may be connected to the trunk. At the completion of a conversation, the ringing key RK must be operated to release the locked-up relay 55 and restore the trunk equipment to normal. When the relay 55 is released, the holding bridge across the trunk line, namely, the repeating coil, is removed and the central office dial equipment is released. The make spring combination on the dial key which is parallel with a similar make spring combination on the listening key is required to operate the relay 55 and light the hold lamp whenever a dial key is operated. The present trunk circuit is provided with a night service provision, the operation of which need not be described in detail. It will be sufficient to understand that when it is desired to establish a night connection from a P. B. X substation to the P. B. X trunk, the battery cut-off key (not shown) is operated and the trunk plug is inserted in the station jack. Whereupon the night key associated with the trunk is operated. The operation of the battery cut-off key will prevent the supervisory lamps from lighting. When the night key is operated it closes the trunk line directly to the P. B. X station telephone line and opens the cord circuit as well as the trunk line from the P. B. X trunk equipment.

It should be mentioned that the relay 55 is made slow to release so that the repeating coil bridge is left across the trunk line until the station "short" is established.

The relay 59 must be slow to release so that the red supervisory lamp 97 will not follow the dial impulses. It will be understood that when the P. B. X subscriber flashes the P. B. X operator, the switch hook must be operated slowly in order for both relays to release and light the red supervisory lamp.

*Connector*

In Fig. 5, the invention is illustrated as applied to a connector switch circuit. In the description of the connector circuit, it will be assumed that the subscriber's substation A has initiated a call by removing his receiver from its desk stand. In response to this operation, the calling subscriber's line is extended in the well-known manner through one or more link circuits in series, until the connector illustrated in this figure has been seized. As soon as this connector has been seized, the impulse relay 100 is energized from grounded battery, upper winding of this relay, back contact and continuity spring of the bridge cut-off relay 101, through the ring side 102 of the connection and through the hook switch contacts (not shown) at the calling subscriber's station through the tip conductor 103, lower continuity spring, back contact of relay 101, and lower winding of relay 100, to ground. As soon as the relay 100 is energized in this circuit, it closes an obvious circuit for energizing the slow releasing relay 104. The connector is now in readiness to receive the directive impulses corresponding to the tens digit of the wanted subscriber's number. In response to each of these dial impulses, the relay 100 retracts and then attracts its armature. On the first retraction of the armature of the relay 100, an operating circuit for the primary or vertical motor magnet 105 is completed from grounded battery, winding of this magnet, through the winding of the change-over relay 106 in series, conductor 107 through the contacts 108 now closed of the off normal switch, conductor 109, lower front contact and armature of the slow releasing relay 104, back contact and armature of relay 100, to ground. In the connector circuits the back contact and armature contact of the relay 100 have the glow lamp L and the resistor R connected in shunt thereof. The primary motor magnet 105 on being energized in circuit above described, moves the brushes 110, 111 and 112 of the connector switch one step in their primary direction. As soon as this step is completed, the off normal switch operates and reverses the position of its contact springs from the position illustrated. In response to the next dial impulse the relay 100 again retracts its armature. In this instance, however, the primary magnet 105 is energized from grounded battery, winding of this magnet, winding of the slow releasing change-over relay in series therewith, front contact and armature of this relay, conductor 113, off normal switch contacts 114, now closed, conductor 109, front contact and armature of relay 104, back contact and armature of the relay 100. In response to each of the succeeding tens impulses, the primary magnet 105 will advance the connector switch brushes one step. The slow releasing relay 104 remains operated during each response of the relay 100 to the dial impulses and, of course, remains energized at the conclusion of these impulses.

However, at the end of the tens series of impulses the change-over relay 106, deenergizes, and at its front contact and armature interrupts the operating circuit of the primary magnet 105. Also when the change-over relay 106 deenergizes, it completes a break-point operating circuit for the secondary or rotary motor magnet 115, from grounded battery, winding of this magnet, armature and back contact of the relay 116, armature and back contact of the relay 117, back contact and armature of the change-over relay 106, off normal contacts 114, conductor 109, front contact and armature of the relay 104, back contact and armature of the relay 100 to ground, when relay 100 retracts its armature in response to the first impulse of the series corresponding to the units digit. The slow releasing relay 118 is energized in multiple with the initial operating circuit of magnet 115. When relay 118 is thus energized, it closes a new operating circuit for magnet 115 and a locking circuit for itself through its lower armature and front contact. This locking circuit is independent of the lower armature and back contact of relay 117 which might otherwise operate and interrupt the stepping circuit for magnet 115 when the test brush 110 of the connector passes over busy lines. In response to each of the remaining impulses corresponding to the units digit of the wanted subscriber's number, the impulse relay will retract its armature and subsequently attract this armature thereby completing the circuit just described for the secondary motor magnet 115. In response to each operation of the motor magnet 115, the connector switch brushes 110, 111 and 112 will be advanced one step in their secondary movement to select the wanted line in the selected group.

At the conclusion of the units series of impulses but before the slow releasing relay 118 releases, the test of the wanted line is effected. If this line is idle, the slow releasing cut-through relay 116 will operate in series with cut-off relay (not shown) of this line, in a circuit from grounded battery, winding of the mentioned cut-off relay, test brush 110, upper armature and back contact of relay 118, lower winding of relay 116, back contact and armature of relay 117, conductor 120, armature and front contact of relay 104 to ground. Relay 116 on operation, locks itself operated from grounded battery, its upper winding, its inner front contact and armature, conductor 121, inner front contact and armature of relay 104 to ground.

Ringing current is applied to the called line through the trip relay 122 and when the called party answers by removing his receiver from its switch hook, relay 122 operates. When relay 122 operates, it locks itself operated through its lower winding, front contact and armature over conductor 121 to ground at the armature and front contact of relay 104.

When the called party answers relay 101 is energized over the two sides of the called line in series through the front contacts and armatures relays 116 and 122. Relay 101 energizes and reverses the battery feed through the windings of relay 101 to the respective sides of the calling connection. Battery for the called end of the connection is supplied through the windings of relay 101.

If the called line is busy, test relay 117, will be operated in a circuit from grounded battery, back contact and middle armature of relay 116, upper front contact and armature of relay 118, test brush 110, test terminal of the called and thence through a test such as 110 of a connector that has seized the wanted line and thereby made it busy, to ground at the lower middle armature and front contact of a relay similar to 116 at the last-mentioned connector.

At the termination of the connection relay 104 will release, to energize the release magnet 124 which restores the connector switch in the well-known manner.

Figure 6:
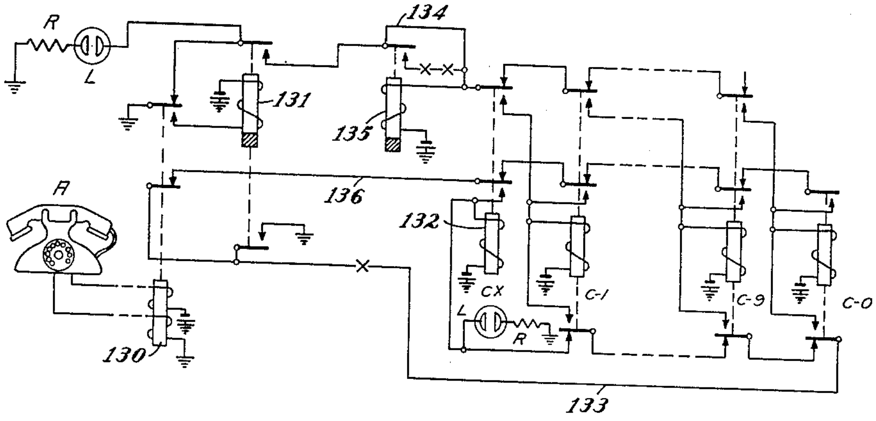
Fig. 6 is a diagrammatic showing of the invention in combination with a counting relay chain and impulse directed means for operating said chain.

In the diagrammatic showing of Fig. 6, the invention is illustrated as applied to the operating circuits of a counting relay chain. In this arrangement it is assumed that the calling subscriber's substation at A has been connected to the counting relay chain unit in any well-known manner. As soon as this connection is effected the impulse relay 130 is energized from grounded battery, upper winding of this relay through the mentioned link connection to the calling substation and thence over the lower side of the connection, lower winding of the relay 130 to ground. The relay 130 is energized in this circuit and at its upper armature and front contact, it completes an obvious circuit for the slow releasing relay 131 which controls the release of the counting relay chain unit. Also as soon as the relay 130 is operated, a circuit is completed for the relay 132 which primes the counting relay chain for operation. The relay 132 is operated from grounded battery, winding of this relay through the lower back contacts and armatures of the counting relays C1 through C9 and C0, relays C2 through C8 being omitted for simplicity of disclosure, and thence over the stick-up conductor 133, which is completed to ground at the armature and front contact of relay 131. With the relay 132 thus operated, a circuit is prepared for the No. 1 counting relay, from grounded battery, winding of this relay, upper front contact and armature of the relay 132, conductor 134, front contact and armature of relay 131, back contact and armature of the impulse relay 130, when this relay releases in response to the first impulse of the series. Likewise, the change-over relay 135 is energized from grounded battery and thence over the conductor 134, front contact and armature of the slow releasing relay 131, back contact and armature of the relay 130 in response to this last-mentioned impulse. The No. 1 counting relay when energized is locked operated from grounded battery, its upper armature and front contact, conductor 136, back contact and armature of the relay 130, lower armature and front contact of relay 131, to ground. When the impulse relay 130 again operates the counting relay C1 is then locked up, from grounded battery through its winding, thence through its lower front contact and armature through the back contacts and armatures of the remainder of the counting relays of the chain, holding conductor 133 to ground. Also, when the No. 1 counting relay is operated, as just described, an operating circuit is prepared from the No. 2 counting relay (not shown) from grounded battery, uppermost front contact and armature of the No. 1 counting relay, back contact and armature of the relay 132, now released, conductor 134, front contact and armature of relay 131, back contact and armature of relay 130, to ground.

The impulsing system of Fig. 6, likewise, has incorporated therein the discharge device L and the series resistor R of the present invention which are connected across the uppermost contact and armature of relay 130, as well as the device L and resistor R which are connected to the holding conductor 133 as shown. These devices and resistors function in the same manner and for the same purposes as already set forth.

While the invention has been disclosed in connection with telephone systems, it is not so limited, but is applicable to various electrical systems and devices wherein rapidly interrupted contacts are employed.

What I claim is:

1. In an automatic telephone system, an impulse repeating relay, an operating circuit for said relay, a dial impulse sender having contacts in said circuit for interrupting and closing the same to generate impulses in accordance with a given impulse ratio, stepping means, a stepping circuit for said stepping means including contacts of said impulse relay, a resistor and an ionizable gas discharge device connected in series across said contacts of the impulse relay, means in said discharge device for providing some emission therein at all times during normal conditions of use whereby the impulses repeated by said impulse relay are not distorted but are stabilized in accordance with the given impulse ratio.

2. In an automatic telephone system, a plurality of telephone lines each provided with a dial impulse sender for generating impulses in accordance with a given impulse ratio, means including an automatic switch for interconnecting said telephone lines, means including a primary motor magnet and a secondary motor magnet operative in succession for advancing said switch to extend a calling telephone line to a called telephone line, an impulse repeating relay associated with said switch, said relay having contacts operated thereby in response to impulses transmitted by the dial sender of the calling line in accordance with a given impulse ratio, a circuit for said primary motor magnet including in series therewith a slow releasing changeover relay and the contacts of said impulse relay, a circuit for said secondary motor magnet extending through normally closed contacts of said changeover relay and the mentioned contacts of said impulse relay, an arc discharge tube as well as a limiting resistor connected in shunt of the contacts of said impulse relay, to constitute the only shunt across said contacts, and means in said discharge tube providing some emission therein at all times during normal conditions of use whereby impulses repeated by said relay to the respective magnets are not materially distorted but remain substantially stabilized.

3. In an electrical impulsing system, a set of rhythmically opened and closed contacts, a glow lamp comprising spaced electrodes in an atmosphere of rare gas, such as neon, enclosed in a sealed envelope, said glow lamp having the characteristic of ionizing on the application to its respective electrodes of a difference of potential of the order of ninety volts across said electrodes and of maintaining its ionization at a sustaining difference of potential of eighty volts, a resistor of the order of four thousand ohms connected in series with said glow lamp and both connected in shunt of said contacts, and means including at least one of said electrodes for providing some emission in said lamp at all times while the lamp is thus connected.

4. In an electrical impulsing system, a direct current source having a voltage in the range below fifty-one volts, a set of normally closed contacts, means for rhythmically opening and closing said contacts, a relatively high impedance electro-magnetic selecting means, connectible in series with said contacts and with said source of direct current, a glow lamp comprising spaced electrodes in an atmosphere of rare gas enclosed in a sealed envelope, said glow lamp having the characteristic of ionizing on the application to its respective electrodes of a difference of potential of the order of ninety volts and of maintaining its ionization at a sustaining difference of potential of eighty volts, a resistor of the order of four thousand ohms connected in series with said glow lamp and both connected in shunt of said contacts to constitute the only shunt across said contacts, and means including at least one of said electrodes for providing some emission in said lamp at all times while the lamp is thus connected.

5. In an automatic telephone system, an impulse relay having at least a set of normally open contacts and a set of normally closed contacts, a source of impulses having a predetermined impulse ratio, means for applying said impulses to said impulse relay for operating said sets of contacts in accordance with said ratio, a slow releasing relay having at least a set of normally open control contacts, an operating circuit for said slow releasing relay completed at first mentioned open contacts, electromagnetically operated selecting means, a circuit for said selecting means including in series relation, said set of normally open control contacts and said set of normally closed contacts, an ionizable gas discharge device and a resistor in series therewith connected in shunt of both of said last-mentioned sets of contacts, and means in said discharge device normally providing some emission therein at all times during use.

6. In an electrical impulsing system, a set of normally closed contacts, means for rhythmically opening and closing said contacts, an arc discharge device in series with a resistor connected in shunt of said contacts to constitute the only shunt across them, and means in said discharge device normally providing some emission therein at all times whereby substantially no electrostatic charge is retained in said device during use.

JAMES R. DEWAR.

REFERENCES CITED

The following references are of record in the file of this patent:

UNITED STATES PATENTS

| Number | Name | Date |
|---|---|---|
| 1,729,858 | Ruggles | Oct. 1, 1929 |
| 1,966,077 | Nyman | July 10, 1934 |
| 2,179,826 | May | Nov. 14, 1939 |
| 2,315,378 | Powell | Mar. 30, 1943 |
| 2,322,650 | Matousek | June 22, 1943 |
| 2,434,065 | Courtney | Jan. 6, 1948 |

FOREIGN PATENTS

| Number | Country | Date |
|---|---|---|
| 392,898 | Great Britain | Aug. 21, 1931 |
| 588,204 | Germany | Nov. 14, 1933 |

OTHER REFERENCES

Electrical Contacts, by G. Windred, MacMillan & Co., Ltd., St. Martins St., London, 1940, pp. 240-268.